Dec. 15, 1942.  J. F. O'BRIEN  2,305,101
ELECTRICAL APPARATUS
Filed Jan. 11, 1941
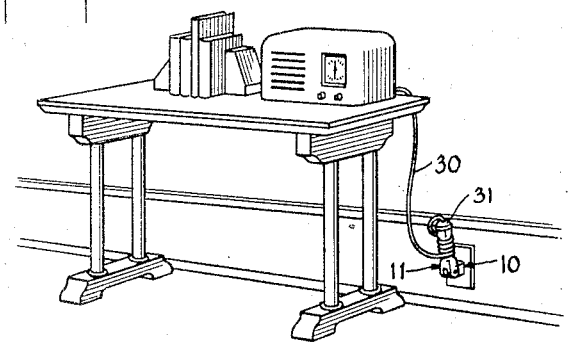
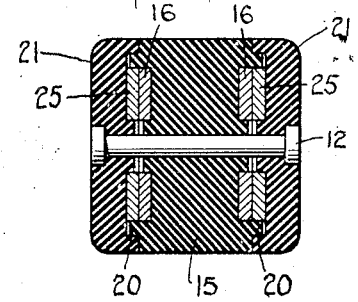
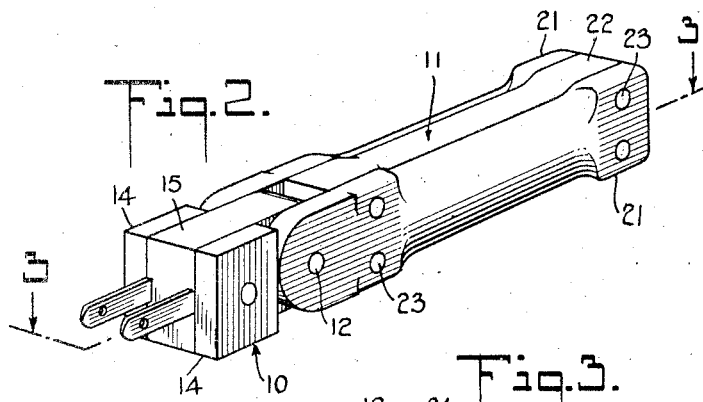
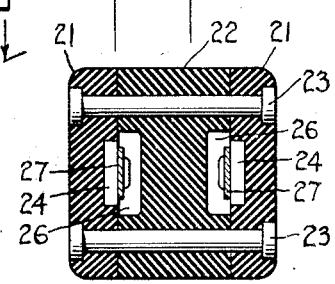
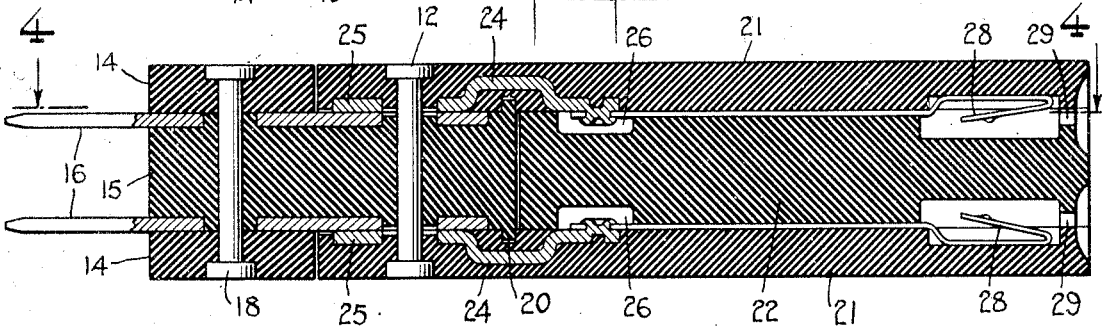
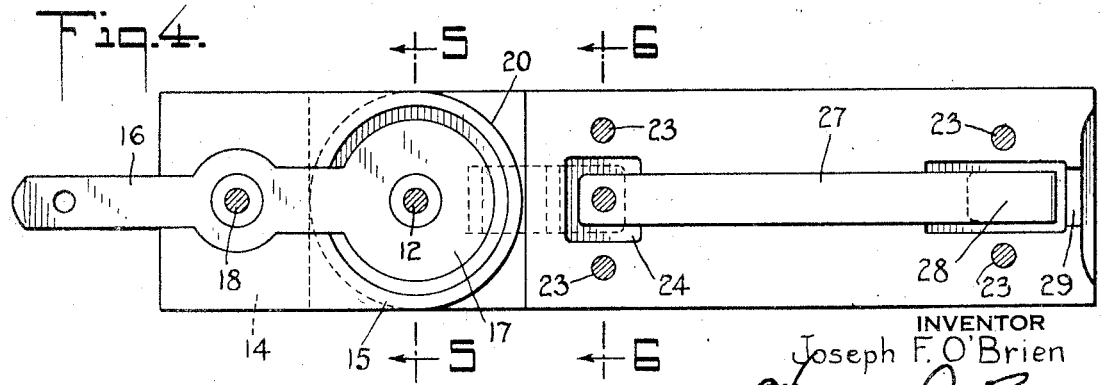
INVENTOR
Joseph F. O'Brien
BY
Henry O. Lucke
HIS ATTORNEY Patented Dec. 15, 1942

2,305,101

UNITED STATES PATENT OFFICE 2,305,101

ELECTRICAL APPARATUS

Joseph F. O'Brien, Jersey City, N. J., assignor to John B. Pierce Foundation, New York, N. Y., a corporation of New York Application January 11, 1941, Serial No. 374,060

1 Claim. (Cl. 173—324)

This invention relates to electrical apparatus.

In particular, the invention relates to an attachment plug device for installation between an electricity outlet and the attachment plug of an electrical accessory, and having an elongated body about which may be wrapped an excess of the connecting wire of such electrical accessory, whereby such excess of wire may be neatly supported.

It is an object of the invention to provide means whereby an electrical accessory such as a radio, clock, floor lamp or the like may be connected to an outlet receptacle in such manner that excess of connection cord from the accessory may be kept off of the floor, for example, thus to minimize a common source of physical injury and fire hazard.

It is a further object of the invention to provide an electrical apparatus of the type aforesaid, in which the wire-receiving elongated body is adjustable to variant angular positions with respect to the plane of the electricity outlet.

It is a further object of the invention to provide electrical apparatus adapted to be plugged into an outlet receptacle, and having an angularly adjustable handle-like extension which may be grasped to render it more convenient for insertion into an outlet receptacle which may not be openly accessible.

In this invention, the electrical apparatus includes a plug-like portion having extending blade contacts for insertion into the apertures of a conventional electricity outlet, and an elongated body of electrical insulation material preferably pivotally attached to said plug device and having electrical conductors suitably electrically connected to the blades of the plug device.

At an end of said elongated body remote from the plug device, said body is provided with apertures within which are arranged suitable contact means, with blade-receiving slots disposed in registry with said spring contact means. The blades of the plug-like device are inserted into the electricity outlet, the connecting wire of the electrical accessory wrapped around the elongated body, and the plug of the electrical accessory inserted into said slots at the terminal end of the body, thereby making electrical connection with the contact means within said body, and hence with the conductors of the electricity outlet.

Other features and advantages will hereinafter appear.

In the accompanying drawing:

Fig. 1 is a perspective of a portion of a room, illustrating my improved electrical apparatus in operative position;

Fig. 2 is a perspective of a preferred embodiment of the present invention, the body portion thereof being in 180 degree angular relationship to the plug portion;

Fig. 3 is an enlarged sectional view of the device, taken on 3—3 of Fig. 2;

Fig. 4 is a plan view of the internal portion of the device, taken on 4—4 of Fig. 3;

Fig. 5 is a vertical section of the device, taken on 5—5 of Fig. 4; and

Fig. 6 is a vertical section of the device taken on 6—6 of Fig. 4.

Referring to the drawing, my improved electrical apparatus includes a plug portion 10 and a body portion 11, both desirably formed of elements molded from electrical insulation material. As appears from Figs. 2 and 3, the body 11 is pivotally secured to the plug 10, as by the rivet 12. Said pivotal association is desirably relatively stiff, so that it will take positive muscular effort to alter the angular relationship of the plug and body portions.

The plug 10 is of composite structure, and includes outer plates 14, 14, of electrical insulation material and an inner member 15, said inner member being suitably longer than the plates 14, 14, and rounded at its terminal end, as clearly appears from Figs. 2 and 4.

As shown in Fig. 3, the plug element 10 is provided with electricity conductors 16, 16, each of which projects to form blades for insertion into an electric outlet device. The other end of said conductors may be enlarged into a disc-like formation to provide a wide circular area 17 of conductive material. A central opening in said circular area 17 accommodates the passage of the rivet 12, in suitable spaced relationship. As clearly appears from Fig. 3, the electricity conductors 16, 16, may be embedded in the face of the central member 15, and portions of said central member 15 form annular insulating walls which fit within the openings in the conductors 16, and protect against short circuit with the rivet 12 and the plug-member securement rivet 18.

Desirably, and as shown in Fig. 3, the terminal of the member 15 is formed with an arcuate rib 20 projecting upwardly above the surface of said body 15, for a purpose later described.

To increase the area of surface contact of the end wall of the plug 10 with respect to the surface of the electric outlet, and thus more firmly to support the plug 10 on the electric outlet, it is desirable to have such end wall of the plug 10 rectangular in outline, as shown in Figure 2.

The elongated body portion 11 may also be formed from three elements of electric insulation material, the outer members 21, 21, and the inner member 22 being mutually secured as by the illustrated pairs of rivets 23. The end of each said body members 21, 21 adjacent the side members 14, 14, of the plug 10 is suitably rounded, as shown in Fig. 2; the completed assembly of plug 10 and body 11 is hinge-like, permitting the body 11 to be swung at an angle, up to and including a right angle, with respect to such plug portion 10.

Suitably embedded in the inner wall portions of the body members 21, 21, are electricity conductors 24, 24, desirably of heavy copper and terminating in a circular end portion 25 of substantial area, adapted to overlie the annular end of the associated conductor 16 of the plug 10 in electrically conductive relationship therewith, as shown in Figs. 3 and 5. Said conductors 24, 24, may be embedded in the elements 21, 21 during the molding thereof.

Desirably, see Fig. 3, material of the side members 21, 21, fills the central opening of the annular portion of the conductors 24, providing adequate insulation between the rivet 12 and said conductors 24, 24.

The central element 22 of said body portion is formed with pockets 26, 26, within which pockets the conductors 24, 24, electrically connect to conductors 27, 27, as by a riveted securement thereto, see Fig. 3. Each conductor 26 extends substantially the length of the body portion, and at a point suitably adjacent the terminal end of said body portion, at which the central member 22 and the outer members 21, 21 are formed with suitable recesses, each conductor 26 is configurated to form spring contact members 28, 28. The terminal end of the body 11 is provided with access slots 29, 29, in registry with the contacts 28. Said slots 29, as will be obvious, accommodate the blades of an attachment plug of the electrical accessory.

As appears from Fig. 2, the body 11 is given a rounded configuration at all but the terminal ends thereof, said rounded configuration making it possible to wrap the cord of an attachment plug tightly therearound without danger of damaging the insulation of such wire. The relatively square ends of the body portion 11 form shoulders which serve to prevent the wire from slipping downwardly off the body 11. The length of the body 11 should accommodate several turns of such cord in a single layer.

As will be seen in Figure 5, the rib 20 of the plug member 10 forms a tongue and groove relation with the end portions of body members 21, 21, to protect the conductors 24, 24, from accidental access at a location where said conductors 24 are closest to the outer wall of the electrical device. Such protection minimizes any accidental short circuiting from the insertion of a knife blade or the like into the fissure between the respective central and outer portions of either the plug element 10 or the body element 15.

The application of my invention is clearly apparent from Fig. 1. The device may originally be in the Fig. 2 position, that is, with the body portion at an 180 degree angle with the plug, and the device grasped by the body portion for the insertion of the contacts 16 into the apertures of the electricity outlet. After the device is in position, the body portion 11 may be rotated upwardly, to assume any required angle, whereupon an excess of connection cord 30 of an electrical accessory may be wrapped about the body portion and the plug 31, thereof connected to the contacts 28 of the device. An unusually long connection cord 30, may result in a bulky excess of cord on the body 11, and it will be apparent that a less than 90 degree angle of the body with respect to the plug will accommodate such length of cord without jamming the cord against the baseboard or the wall. Otherwise, such jamming of the cord against the wall may either prevent the proper contact of the conductors 16 with the conductors of the outlet receptacle, or even gradually work the plug device 10 outwardly and break the electrical connection with the electricity outlet.

It should be understood that my invention is not applicable merely to baseboard outlets, as illustrated in Figure 1. It can be used with equal facility with the conventional conversion plug adapted to be screwed into a screw socket, or in a wall type of electricity outlet.

Whereas I have described my invention by reference to specific forms thereof, it will be understood that many changes and modifications may be made without departing from the spirit of the invention.

I claim:

An electric wiring device comprising in combination, a plug member and a therewith hingedly attached elongate member to which an attachment plug of an accessory device may be connected; said plug member comprising a body of insulation material, an electricity conductor positioned on each of two sides of said body, each said conductor projecting beyond said body at one end to form a blade for insertion into an electric convenience outlet and terminating at the other end in a substantially circular contact plate, insulating blocks of less length than said body positioned over a portion of said electricity conductors to leave said contact plates exposed; said elongate member having a forked end into which the end of the plug member and the contact plates thereof extend, said elongate member having contact plates overlying the contact plates of the plug member in conductive relationship therewith, electricity conductors positioned internally of said elongate member and electrically connected to the contact plates thereof, said electricity conductors terminating in contact means for electrical connection with the blades of an attachment plug, said contact means being disposed wholly within said elongate member and accessible through plug-receiving openings provided in the end of said member; said second member being characterized by a length greatly exceeding the length of the plug member and having an elongate substantially circular central portion defined by shoulders at the ends thereof; and a pivot passing through the forked end of said elongate member and the body of said plug member to hingedly secure said plug member and said elongate member.

JOSEPH F. O'BRIEN.